UNITED STATES PATENT OFFICE.

LEONHARD LEDERER, OF MUNICH, GERMANY.

PROCESS OF PRODUCING PHENOXACETIC ANILIDS, &c.

SPECIFICATION forming part of Letters Patent No. 543,579, dated July 30, 1895.

Application filed October 29, 1894. Serial No. 527,329. (Specimens.)

*To all whom it may concern:*

Be it known that I, LEONHARD LEDERER, doctor of philosophy, a subject of the King of Bavaria, residing at Munich, in the Kingdom of Bavaria, German Empire, have invented new and useful Improvements in Processes of Producing the Anilids of the Phenoxacetic Acid and Their Homologues, of which the following is a specification.

Certain acid derivatives of anilin and of the substituted anilins—such as antifebrin, exalgin, phenacetin, &c.—have febrifuge properties, and are therefore employed frequently in medical practice. The anilids of the phenoxacetic acids which are obtained by the action of chloracetic acid on phenols and distinguished by their antiseptic action also produce a prominent therapeutic effect. The anilids of the phenoxacetic acids are decomposed, as are all such compounds, by acids and alkalies into their constituents. These substances are similarly decomposed when they are introduced into the human system. While with the above-mentioned acetylized anilin (antifebrin) or anilin derivatives (exalgin, and phenacetin) the physiological effect extends in one direction only and is to be attributed to the base separated by the decomposition of the substance into its original constituents, it becomes perceptible in the phenoxacetic anilids in two directions for the reason that the phenoxacetic acids act in a therapeutic manner as well as the base.

The anilid derivatives of the phenoxacetic acids are well-defined crystalline substances. They are not soluble in water, but are absorbed by alcohol, and, also, partially by ether.

In carrying out my process I proceed as follows: Phenoxacetic acid and para-phenetidin are heated in molecular quantities to a temperature of from 120° to 140° until no more water is given off. The product of the reaction solidifies in cooling to a hard crystalline mass. It is dissolved by boiling alcohol, from which the phenoxacet-para-phenetidid separate in colorless crystals. In a similar manner all the other anilids of the phenoxacetic acids are produced, the properties of which are as follows:

First. Phenoxacet-para-amidophenol forms felted needles, melting at a temperature of 158° or 159° and readily soluble in hot alcohol, but soluble with difficulty in cold alcohol.

Second. Phenoxacet-para-anisidid crystallizes in well-formed prisms, melting at a temperature of 135° or 136°. It is abundantly absorbed by hot alcohol.

Third. Phenoxacet-para-phenetidid is obtained in needles from its alcoholic solution, melting at a temperature of 130° or 131°.

Fourth. Oxy-kresoxacet-para-phenetidid melts at a temperature of 112° or 113°, woolly needles, rather soluble in hot alcohol.

Fifth. Meta-kresoxacet-para-phenetidid forms long silky lustrous needles. It is readily soluble in hot alcohol and melts at a temperature of 124° or 125°.

Sixth. Para-kresoxacet-para-phenetidid melts at a temperature of 133° or 134°. It is moderately soluble in hot alcohol and crystallizes in needles.

Seventh. Guajacoxacet-para-phenetidid is obtained from its alcoholic solution in needles, melting at a temperature of 103° or 104°.

Eighth. Kreosoxacet-para-phenetidid crystallizes in needles. It melts at a temperature of from 80° to 82° and is readily soluble in benzene and soluble with difficulty in gasoline.

Ninth. Thymoxacet-para-phenetidid is separated from its hot solution in alcohol, wherein it is abundantly soluble in the form of needles, melting at a temperature of 129° or 130°.

Tenth. Carvacroxacet-para-phenetidid is readily soluble in hot alcohol and crystallizes therefrom in needles. It melts at a temperature of 105° or 106°.

Eleventh. Eugenoxacet-para-phenetidid forms from alcohol crystallized needles, melting at a temperature of 93° or 94°.

Twelfth. Alpha-naphtoxacet-para-phenetidid is only moderately soluble in hot alcohol. It crystallizes in needles and melts at a temperature of 145° or 146°.

Thirteenth. Beta-naphtoxacet-para-phenetidid is soluble with difficulty in hot alcohol. It crystallizes in needles, the melting-point of which is at 164° or 165°.

Fourteenth. Para-nitrophenoxacet-para-phenetidid crystallizes in globularly-grouped needles. It is soluble with difficuly in hot alcohol and melts at a temperature of 156° or 157°.

Fifteenth. Carvacroxacetanilid forms needles. It melts at a temperature of 102° or 103°, and it is readily soluble in alcohol.

Sixteenth. Guajacoxacetanilid crystallizes in needles, melting at a temperature of 84° or 85°. It is very readily soluble in alcohol and readly soluble in benzol. It is only a little absorbed by gasoline.

Seventeenth. Kreosoxacetanilid is separated in the form of flat needles from its solution in benzene, wherein it is readily soluble. Its melting-point is at 87° to 89°.

Eighteenth. Eugenoxacetanilid is readily soluble in benzene, soluble with difficulty in gasoline, forms needles, and melts at a temperature of from 55° to 57°.

Nineteenth. Alpha-naphtoxacetanilid crystallizes in the form of needles from hot alcohol, wherein it is soluble with difficulty. It melts at a temperature of 147° or 148°.

Twentieth. Beta-naphtoxacetanilid is soluble with difficulty in hot alcohol and it is obtained from this solvent in the form of needles, the melting-point of which is at 145° or 146°.

Twenty-first. Para-nitrophenoxacetanilid forms needles, melting at a temperature of 170° or 171° It is soluble only with difficulty in hot alcohol.

I claim—

1. The herein described process for the production of the anilids of the phenoxacetic acids, consisting in reacting on phenoxacetic acids with aromatic amido-compounds.

2. The herein described process for the production of phenoxacet-para-phenetidids, consisting in reacting on phenoxacetic acids with para-phenetidin, then dissolving the product with alcohol and separating the crystals of phenoxacet-para-phenetidids.

In testimony whereof I have signed my name to this specification in the presence of two subscribing witnesses.

LEONHARD LEDERER.

Witnesses:
LEONHARD WALKER,
GEORG COHN.